United States Patent

Chwastiak et al.

[11] Patent Number: 5,817,432
[45] Date of Patent: Oct. 6, 1998

[54] SILICON CARBIDE REINFORCED REACTION BONDED SILICON CARBIDE COMPOSITE

[75] Inventors: Stephen Chwastiak, Charlotte, N.C.;
Sai-Kwing Lau, East Amherst, N.Y.;
Carl H. McMurtry, Youngstown, N.Y.;
Gajawalli V. Srinivasan, Williamsville, N.Y.

[73] Assignee: The Carborundum Company, Worcester, Mass.

[21] Appl. No.: 698,740

[22] Filed: Aug. 16, 1996

Related U.S. Application Data

[62] Division of Ser. No. 447,148, May 22, 1995, Pat. No. 5,643,514, which is a continuation of Ser. No. 150,649, Nov. 4, 1993, Pat. No. 5,484,655, which is a division of Ser. No. 852,589, Mar. 17, 1992, Pat. No. 5,296,311.

[51] Int. Cl.$^6$ .................................................. B32B 17/00
[52] U.S. Cl. ......................... 428/698; 428/241; 428/242; 428/245; 428/293
[58] Field of Search ..................................... 428/688, 689, 428/367, 378, 389, 241, 242, 245, 293

[56] References Cited

U.S. PATENT DOCUMENTS 5,296,311  3/1994  McMurtry ................................ 428/688
5,484,655  1/1996  Lau ........................................ 428/367

Primary Examiner—Timothy M. Speer
Attorney, Agent, or Firm—Thomas M. DiMauro

[57] ABSTRACT

The invention includes a process for producing a reaction bonded silicon carbide composite reinforced with coated silicon carbide fibers which is suitable for high temperature applications. The process includes the steps of coating SiC fibers with AlN, BN or TiB$_2$; treating the coated fibers with a mixture of SiC powder, water and a surfactant; preparing a slurry comprising SiC powder and water; infiltrating the coated fibers with the slurry to form a cast; drying the cast to form a green body; and reaction bonding the green body to form a dense SiC fiber reinforced reaction bonded matrix composite.

The invention further includes a SiC fiber reinforced SiC composite comprising a reaction bonded SiC matrix, a SiC fiber reinforcement possessing thermal stability at high temperatures and an interface coating on the fibers having chemical and mechanical compatibility with the SiC matrix and with the SiC fibers.

24 Claims, 6 Drawing Sheets

SILICON CARBIDE REINFORCED REACTION BONDED SILICON CARBIDE COMPOSITE

This is a divisional application of U.S. application Ser. No. 08/447,148, filed May 22, 1995, now U.S. Pat. No. 5,643,514 which is a continuation of U.S. application Ser. No. 08/150,649, filed Nov. 4, 1993, now U.S. Pat. No. 5,484,655; which is a division of U.S. application Ser. No. 07/852,589, filed Mar. 17, 1992, now U.S. Pat. No. 5,296,311.

FIELD OF INVENTION

This invention relates to dense matrix composites suitable for high temperature applications. More particularly, this invention relates to SiC fiber reinforced reaction bonded SiC composites wherein the SiC fibers are coated with a ceramic material.

BACKGROUND OF THE INVENTION

Reinforced ceramic matrix composites are well suited for structural applications because of their potential toughness, thermal resistance, high temperature strength and chemical stability. These composites can be produced by the addition of whiskers, fibers or platelets to a ceramic matrix. The non-brittle nature of these composites provides the much needed reliability that is otherwise lacking in monolithic ceramics.

Fabrication of ceramic matrix composites reinforced with sintered continuous fibers is more difficult than fabrication of dense monolithic ceramics. Conventional sintering of a green ceramic matrix reinforced with sintered fibers is not possible if the green ceramic matrix has rigid inclusions. Densification can, however, be achieved by chemical vapor infiltration (CVI) or reaction bonding. Reaction bonding is the preferred method because it is less time consuming and more often produces a fully dense body than the CVI process. For high temperature applications, full densification is necessary to prevent rapid oxidation degradation of the reinforcements or reinforcement coating.

Densification by reaction bonding, described in U.S. Pat. No. 3,205,043 to Taylor, involves infiltrating molten silicon through the pores of a green body containing SiC and carbon. The silicon reacts with the carbon to form SiC, which then bonds the SiC grains together. In the absence of carbon, the infiltrated molten silicon solidifies upon cooling, thereby filling the pores of the SiC bonded SiC body. This process is known as siliconization. The resulting fully dense end product contains SiC and residual free silicon. Since reaction bonding does not involve shrinkage of the green body as does conventional sintering, the final dense product is a near net shape.

Fracture resistance of ceramic matrix composites is achieved through crack deflection, load transfer, and fiber pull-out. Fiber pull-out, which is well established as central to the toughness of ceramic fiber composites, is achieved by having little or no chemical bonding between the fibers and matrix. The fibers must be able to readily debond and slide along the matrix for increased fracture toughness of the composite.

It is known that many fiber-matrix combinations undergo extensive chemical reaction or interdiffusion between the fiber and matrix materials, each of which is likely chosen for the contribution of specific mechanical and/or physical properties to the resulting composite. Such reaction or interdiffusion can lead to serious degradation in strength, toughness, temperature stability and oxidation resistance. The fiber-matrix interface is therefore very important to preventing or minimizing chemical reactions and interdiffusion.

Surface modification of the fibers is an effective means to control the fiber-matrix interface. This can be accomplished by coating the fibers with a suitable ceramic to inhibit the fibers from reacting or bonding with the matrix. The ceramic coating allows the fiber to pull out from the matrix and slide along the matrix, thus increasing the fracture toughness of the composite.

Coated silicon carbide fibers and whiskers are known reinforcements for composite materials. U.S. Pat. No. 4,929,472 to Sugihara et al. discloses SiC whiskers having a surface coated with a thin, 7–100 Å, carbonaceous layer and SiC whiskers coated with a $Si_3N_4$ layer which is 15–200 Å thick. These surface coated whiskers are used as a reinforcing material for ceramics such as SiC, TiC, $Si_3N_4$, or $Al_2O_3$.

U.S. Pat. No. 4,781,993 to Bhatt discloses a SiC fiber reinforced reaction bonded $Si_3N_4$ matrix wherein the SiC fibers are coated with an amorphous carbon layer and an overlayer having a high silicon/carbon ratio covering the amorphous layer.

U.S. Pat. No. 4,642,271 to Rice discloses BN coated ceramic fibers embedded in a ceramic matrix. The fibers may be composed of SiC, $Al_2O_3$ or graphite, while the matrix may be composed of $SiO_2$, SiC, $ZrO_2$, $ZrO_2$—$TiO_2$, cordierite, mullite, or coated carbon matrices.

U.S. Pat. No. 4,944,904 to Singh et al. discloses a composite containing boron nitride coated fibrous material. Carbon or SiC fibers are coated with BN and a silicon-wettable material and then admixed with an infiltration-promoting material. This mixture is then formed into a preform which is then infiltrated with a molten solution of boron and silicon to produce the composite.

Teusel et al. in "Aluminum Nitride Coatings on Silicon Carbide Fibres, Prepared by Pyrolysis of a Polymeric Precursor", J. Mat. Sci., 25 (1990) 3531–3534, discloses a method of coating SiC fibers. Nicalon (SiC) fibers, Nippon Carbon Co. Ltd., were thermally pretreated in nitrogen and dip coated with a solution of metallic aluminum in an organic electrolyte. The fibers were then calcined at 900° C. under anhydrous ammonia. The authors found that a thin coating, about 0.5 microns, produced a smoother and more uniform surface than thicker coatings. The performance of these AlN coated SiC fibers in a SiC matrix was not discussed in the Teusel et al. article.

A specific problem encountered with SiC reinforced SiC composites is that the SiC fibers or coatings on the SiC fibers may react with the matrix during formation of the composite, resulting in a strong fiber-matrix bond. This strong interfacial bond leads to decreased fracture toughness. It is an object of the invention, therefore, to provide a process for incorporating SiC fibers into a SiC matrix while controlling the fiber-matrix interface to achieve high fracture toughness. It is also an object of the invention to provide a process for producing a SiC composite possessing high temperature strength.

SUMMARY OF THE INVENTION

The present invention has resulted from the discovery that a reaction bonded silicon carbide composite reinforced with coated silicon carbide fibers can produce a dense ceramic composite suitable for high temperature applications. AlN, BN and $TiB_2$ coatings were found to limit both mechanical and chemical bonding with the matrix to improve the strength and toughness of the composite material.

The present process for producing SiC fiber reinforced SiC composites includes the steps of coating SiC fibers with a composition selected from the group consisting of AlN, BN and $TiB_2$; treating the surface of the coated fibers with a mixture of SiC powder, water and a non-ionic surfactant; preparing a slurry comprising SiC powder and water; vacuum infiltrating the coated fibers with the slurry to form a cast; drying the cast to form a green body; and reaction bonding the green body to form a dense SiC fiber reinforced reaction bonded matrix composite.

The SiC reinforced SiC composite of the present invention includes a reaction bonded SiC matrix, a SiC fiber reinforcement possessing thermal stability at temperatures of at least 1420° C., preferably 1500° C. and an interface coating on the fibers having chemical and mechanical compatibility with the SiC matrix and with the SiC fibers.

DETAILED DESCRIPTION OF THE INVENTION

Figure 1:
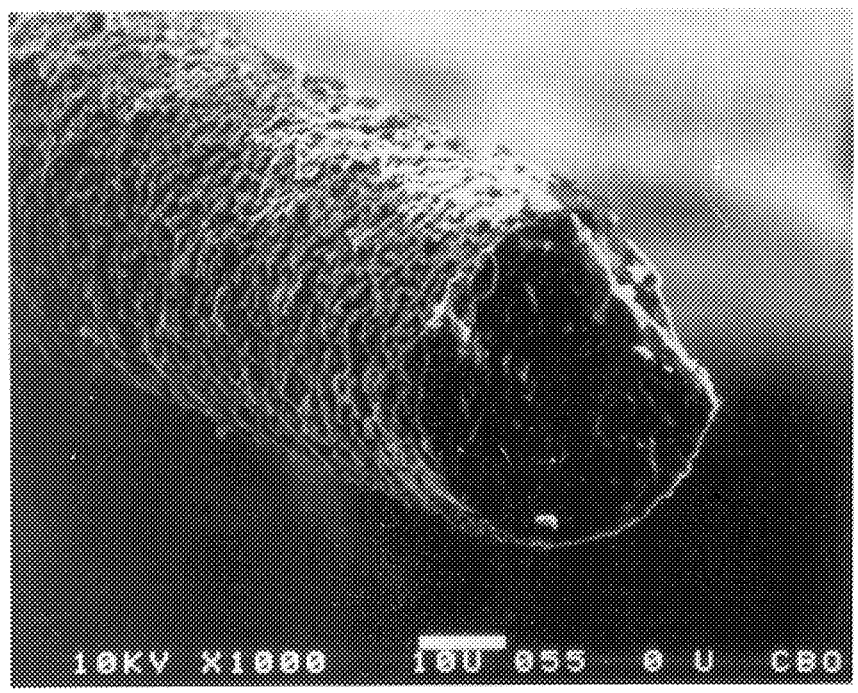
FIGS. 1 and 2 are 1000 times and 1500 times magnified microscopic photographs showing the fracture surfaces of AlN coated SiC fibers.

The subject invention relates to a process for producing SiC fiber reinforced reaction bonded SiC matrix composites wherein the fibers are coated with a non-oxide ceramic material and the article thus produced. The matrix material provided in the present invention is reaction bonded SiC which possesses net shape processing capability and ease of fabrication.

The SiC fibers employed in the present invention are sintered polycrystalline SiC fibers from The Carborundum Company, Niagara Falls, N.Y. However, other SiC fibers, such as those produced by chemical vapor deposition or other processes could be used if they are suitable for use in the reaction bonding process, especially those possessing thermal stability at 1420° C. or higher. Most of the existing commercial precursor-derived SiC fibers such as Nicalon (Nippon Carbon Company) and Tyranno (UBE Industries, Japan) are not suitable for this application because they lack the thermal stability necessary for use in reaction bonded SiC composite fabrication.

To achieve the desired composite properties, namely, high temperature strength and fracture toughness, it is necessary that there is a suitable interface coating between the matrix and the fiber. To provide non-catastrophic failure of the composite, the fracture energy must be dissipated by the fiber pulling out from the matrix and sliding along the matrix. The frictional sliding expends the energy, thereby providing increased fracture toughness. If uncoated SiC fibers are incorporated into a matrix of reaction bonded SiC, fiber pull out is not achieved because of the bonding of the SiC fiber with the SiC matrix. Thus, any crack that occurs in the surface of the composite will propagate through the matrix and continue through, i.e., transverse to, the fiber resulting in the typical brittle fracture behavior of conventional monolithic ceramics.

The preferred non-oxide ceramic coatings for the SiC fiber reinforcements are AlN, BN and $TiB_2$ and combinations thereof. A further preferred fiber coating is AlN because AlN exhibited the most desirable fiber pull out behavior with the reaction bonded SiC matrix.

The non-oxide ceramic can be coated onto SiC fibers by several methods, including, (1) chemical vapor deposition, (2) evaporation of aluminum, followed by chemical conversion with $NH_3$, and (3) deposition of an $Al_2O_3$ coating through sol-gel, followed by chemical conversion with $NH_3$. Chemical vapor deposition is the preferred method because it is most convenient and thus far has produced the most uniform coatings.

An AlN coating thickness of between about 1–15 microns on the SiC fibers is desired. A BN coating thickness of between about 0.1 to 10 microns is desired. The preferred thickness of BN is between about 0.5 to 2 microns. We have found that thin AlN coatings, less than 1 micron, were inadequate because the AlN actually dissolved in and reacted with the molten silicon during the infiltration process. After incorporating thinly coated fibers into the reaction bonded SiC matrix, no AlN coating nor fiber pull out could be detected. However, when sintered fibers coated with a thicker layer of AlN were incorporated into the reaction bonded SiC matrix and fractured in a four-point bending test, fiber pull out could be observed. This is demonstrated in FIGS. 5 and 6. Although some AlN may react or dissolve in molten silicon during reaction bonding, fiber pull out will still occur as long as there remains some unreacted AlN coating on the SiC fibers. The AlN coating remaining on the SiC fibers after reaction bonding is between 0.1 to 15 microns thick.

A green body of coated SiC fiber reinforced SiC composite is preferably produced by a slurry filtration process. In this process, the slurry is prepared by ball milling SiC powder (for example, submicron SiC powder marketed by Arendal Smelteverk A.S., Norway) in water. To ensure good dispersion of the powder, the pH of the slurry is adjusted to between 8 and 10 by adding ammonium hydroxide to the slurry. A small amount, about 0.5 wt %, of sodium silicate may be used as a binder. Other binders that can be used include PVA, sucrose syrup, phenolic, acrylic latex and other water soluble binders. The solid content of the slurry is preferably between 20 and 80 wt %. The slurry is then poured into a mold.

An appropriate amount of sintered SiC fiber in the form a bundle is dipped into a mixture of SiC powder and water (solid content of 10–50 wt. %) containing about 2% or less of a non-ionic wetting agent, such as 2 wt % Triton x-100 surfactant, comprising iso-octylphenoxypolyethoxyethanol. The surfactant treated fiber bundle is then laid in the SiC slurry and infiltrated and dewatered. The resulting cast is allowed to fully dry to form the green body. The green body is then completely densified by conventional siliconization/ reaction bonding. The temperature range for siliconization/ reaction bonding is between 1420° C. (the melting point of silicon) and 2400° C., and preferably between 1500° and 1600° C. The process is preferably carried out under vacuum to prevent oxidation, but can be carried out in atmospheric pressure. Complete densification is achieved at temperatures as low as 1500° C. in ½ to 1 hour under vacuum for small test samples. Densification time and temperature depend on the size of the article and on the carbon content in the slurry.

Carbon as particulate carbon, colloidal carbon, or carbon-yielding resins may also be added to the SiC slurry. However, it is important that the rheology and chemistry of the slurry is not severely altered. The added carbon can help achieve good wicking of molten silicon during the reaction bonding process and help minimize residual silicon in the dense body by reacting with the Si to form SiC.

Composites with fiber volume fraction as high as 0.44 were also produced. Composites produced without the addition of wetting agent to the slurry had regions where veins of silicon were present. However, when the wetting agent is used, these silicon veins were absent and a uniform microstructure was obtained.

A fracture toughness of about 13 MPa m$^{1/2}$ was calculated from the fiber pull out lengths for a reaction bonded SiC matrix composite having about 40 vol. % of AlN coated fibers. Similar fiber pull out for BN coated SiC fibers in a reaction bonded SiC matrix has been observed, as is demonstrated in FIG. 6. Because AlN has a higher oxidation resistance than BN, it is expected that the AlN coated SiC fiber reinforced composite will have a higher oxidation resistance than the BN coated SiC fiber reinforced composite.

The SiC fiber reinforced reaction bonded composite of the present invention possesses thermal stability up to 1420° C.

Figure 3:
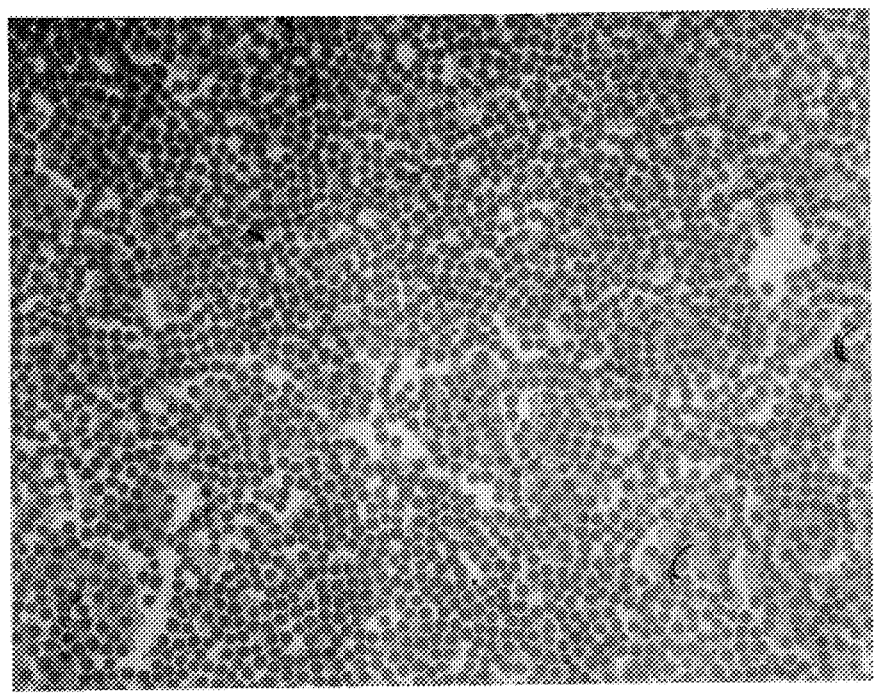
FIGS. 3 and 4 are micrographs of the reinforced composite manufactured in accordance with the process of the present invention.
Figure 4:
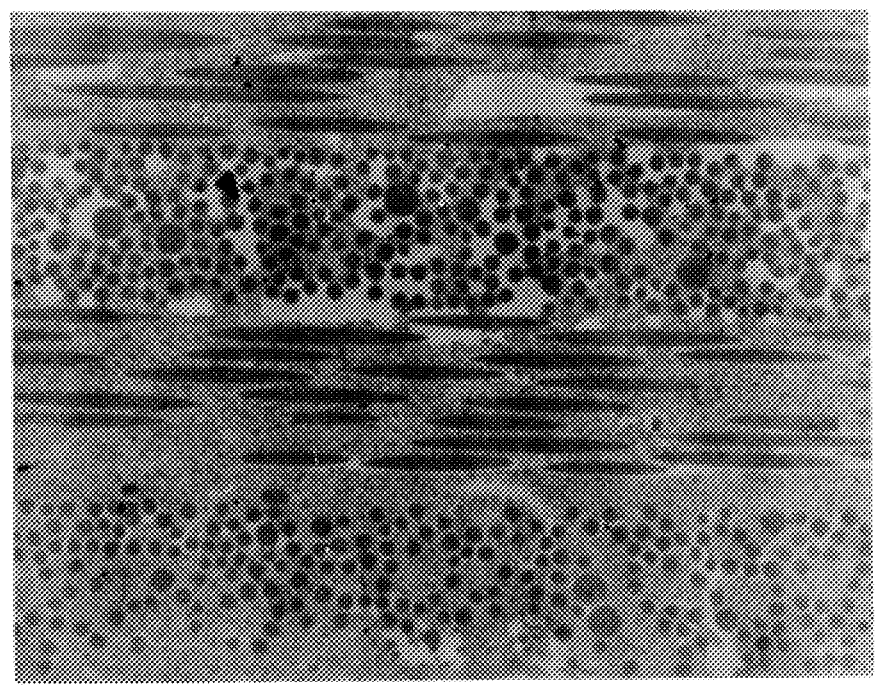

FIGS. 3 and 4 are micrographs of the reinforced composite manufactured in accordance with the process of the present invention.

The examples which follow are intended to illustrate and not to limit the inventive concepts presented herein.

SPECIFIC EXAMPLES

Example 1

Figure 2:
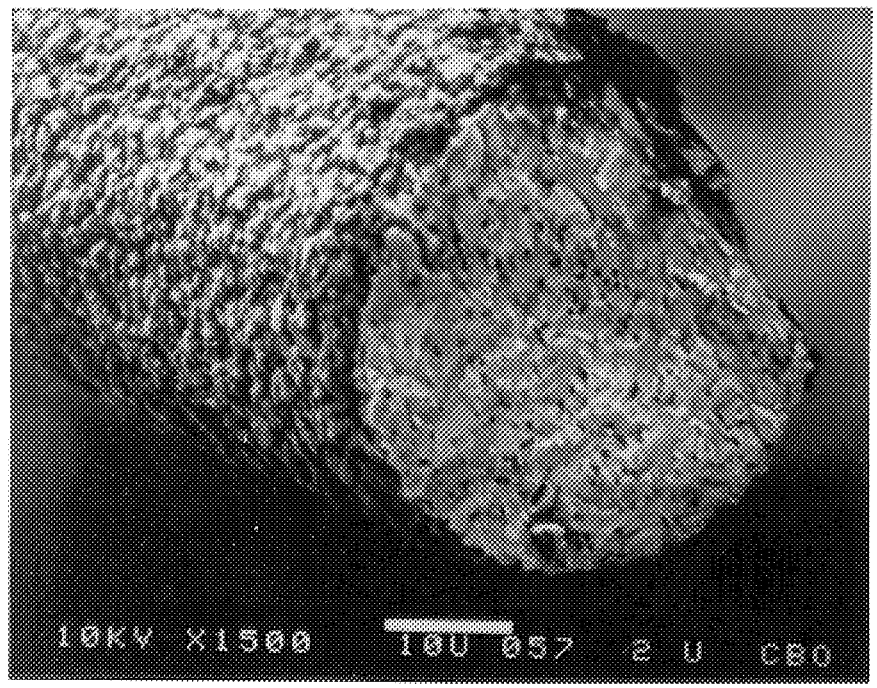

SiC fibers were coated with AlN by a chemical vapor deposition (CVD) process. The CVD coating process involved the use of AlCl$_3$ and NH$_3$ as precursors. Solid AlCl$_3$ was heated to about 120°–150° C. and the AlCl$_3$ vapor that was generated was transported by hydrogen gas flow to the hot zone where the NH$_3$ was introduced. The AlCl$_3$ react with NH$_3$ to produce AlN. The typical deposition temperature was about 850°–1000° C. The pressure in the deposition chamber was about 50 torr. The resulting AlN coating thickness varied from 5–15 microns. FIGS. 1 and 2 show these AlN coated SiC fibers.

A green body of AlN coated SiC fiber reinforced composite was fabricated by a slurry filtration process. The slurry was prepared by ball milling SiC powder (Submicron Arendal) in water. The solids content of the slurry was about 75 wt %. The pH of the slurry was adjusted to 9 by adding ammonium hydroxide. About 0.5 wt % of sodium silicate was used as a temporary binder. Mixing was accomplished by ball milling for 24 hours. About 4 grams of slurry was poured into a glass mold 0.25×0.25×1 inch which was placed over filter paper in a Buchner funnel.

About 1.75 grams of AlN coated SiC fibers in the form of a bundle was dipped into a diluted SiC/water slurry with 50 wt % SiC and 0.1 wt % Triton X-100 surfactant to surface treat the fibers and facilitate infiltration. The treated bundle was then placed into the glass mold containing the undiluted slurry. A vacuum was drawn on the funnel containing the mold until the cast was fairly dry.

The cast was allowed to fully dry. The cast was then placed in a furnace and completely densified by conventional reaction bonding/siliconization. Complete densification was obtained at 1500° C. in 1 hour under vacuum.

Figure 5:
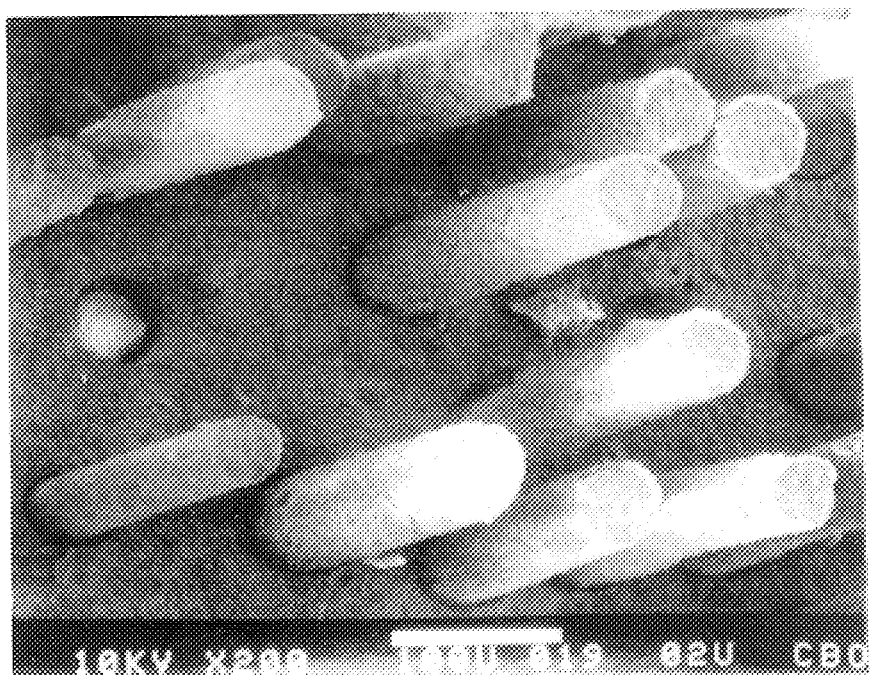
FIG. 5 is a 200 times magnified microscopic photograph showing fiber pull out at the fracture surface of a reaction bonded SiC matrix composite incorporating AlN coated SiC fibers.

The volume percent of coated fibers for this sample was estimated to be about 30%. The sample was fractured in a standard four point bend test. Fiber pull-out was observed as shown in FIG. 5.

Example 2

SiC fibers were coated with BN by a CVD process. The average coating thickness was about 2 microns. The composite was fabricated substantially in accordance with Example 1. The volume percent of coated fibers was about 12%.

Figure 6:
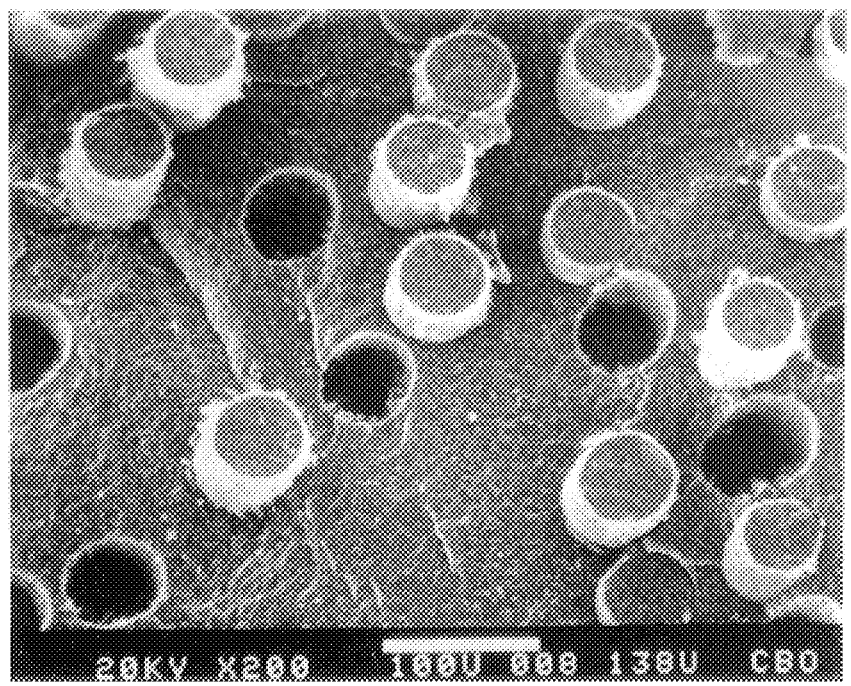
FIG. 6 is a 200 times magnified microscopic photograph showing fiber pull out at the fracture surface of a reaction bonded SiC matrix composite incorporating BN coated SiC fibers.

The composite sample was fractured in a standard four point bend test. Fiber pull-out was observed as shown in FIG. 6.

Figure 7:
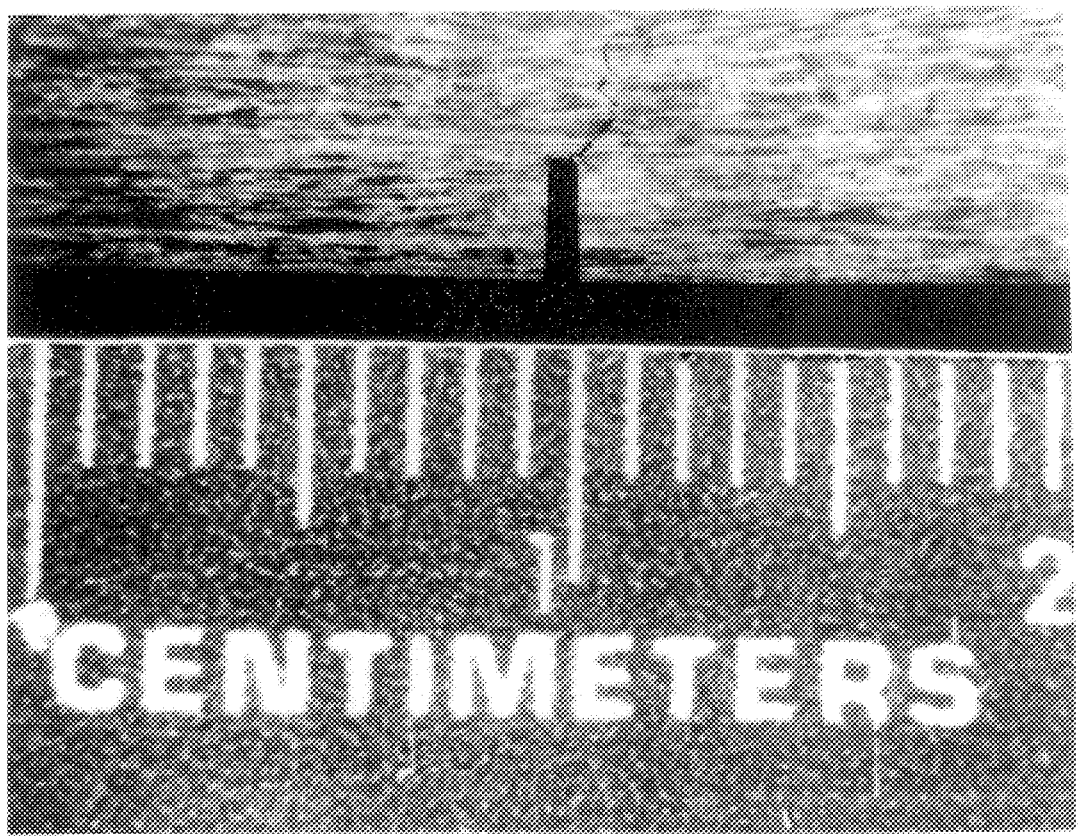
FIG. 7 is a photograph showing the stable crack growth of a reaction bonded SiC composite containing BN coated SiC fibers.
Figure 8:
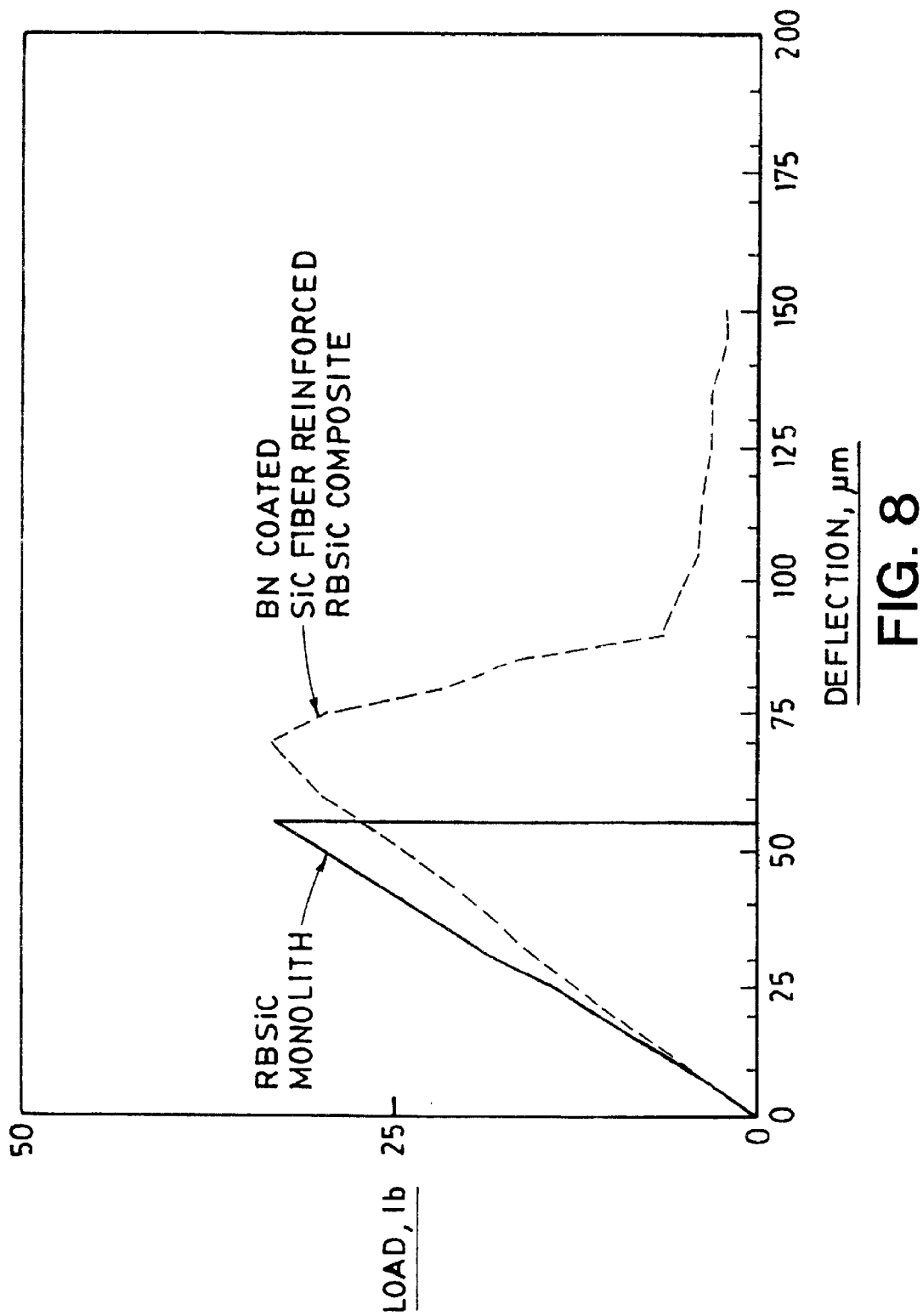
FIG. 8 is a graph showing the load-deflection curves for both a BN coated SiC fiber reinforced reaction bonded SiC composite according to the present invention and a monolithic reaction bonded SiC.

To test the crack deflection of the composite, a notch was cut in a composite sample having the dimensions ⅛"×¼"× 2". The sample was then subjected to a four point bend test. Stable crack growth was observed as shown in FIG. 7. In FIG. 8, the load-deflection characteristics for a BN coated SiC fiber reinforced reaction bonded SiC composite were compared to those of a monolithic reaction bonded SiC composite. The SiC fiber reinforced composite shows stable crack growth as evidenced by the non-linear composite behavior. The monolithic reaction bonded SiC composite, on the other hand, shows catastrophic failure at a load of around 33 lbs. The stable crack growth of the SiC fiber reinforced SiC reaction bonded matrix is attributed to fiber pull-out.

Comparative Example 3

Figure 9:
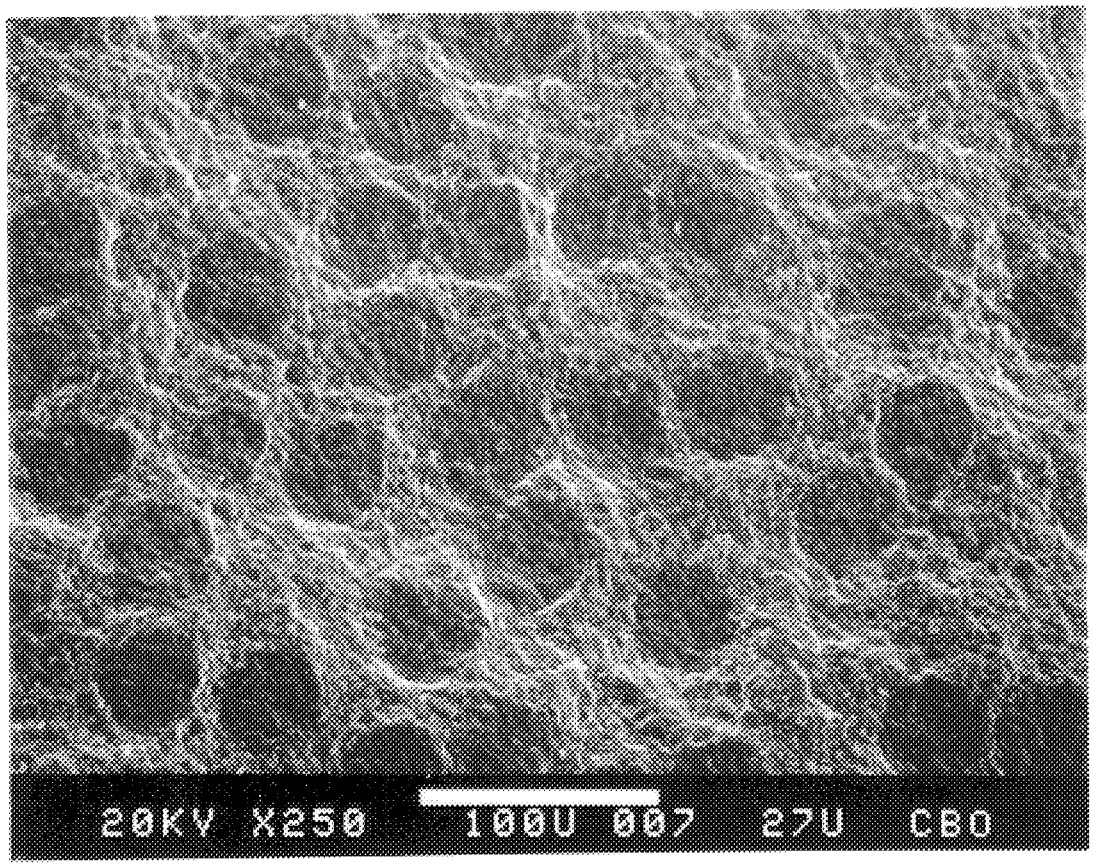
FIG. 9 is a 250 times magnified microscopic photograph of the fracture surface of uncoated SiC fiber reinforced reaction bonded SiC matrix composite showing no fiber pullout.

A composite was fabricated substantially in accordance with Example 1, except that uncoated SiC fibers were incorporated into the reaction bonded SiC composite. No fiber pull-out was observed as shown in FIG. 9.

The foregoing examples are not intended to limit the subject invention, the breadth of which is defined by the specification and the claims appended hereto, but are presented rather to aid those skilled in the art to clearly understand the invention defined herein.

What we claim is:

1. A green body consisting essentially of:
    a) a preform comprising ceramic fiber comprising silicon carbide and having porosity, and
    b) ceramic particles infiltrated into the porosity of the preform.

2. The green body of claim 1 wherein the fiber comprising silicon carbide has a non-oxide coating thereon.

3. The green body of claim 1 wherein the ceramic particles are silicon carbide.

4. The green body of claim 1 wherein the fiber preform comprises fiber comprising silicon carbide, the fiber has a non-oxide coating thereon, and the ceramic particles are silicon carbide.

5. The green body of claim 4 wherein the non-oxide coating comprises a compound selected from the group consisting of aluminum nitride, titanium diboride and boron nitride.

6. The green body of claim 4 further comprising a surfactant upon the non-oxide ceramic coating.

7. The green body of claim 4 wherein the non-oxide coating comprises boron nitride.

8. The green body of claim 7 wherein the boron nitride has a thickness of 0.5 to 2 um.

9. The green body of claim 1 wherein the ceramic fiber comprising silicon carbide has thermal stability at a temperature of at least 1420° C.

10. A composite comprising:
   a) ceramic fiber comprising silicon carbide, and
   b) a matrix surrounding the ceramic fiber, the matrix consisting essentially of a continuous phase and an infiltrated ceramic particulate phase.

11. The composite of claim 10 wherein the ceramic fiber comprising silicon carbide has a non-oxide coating thereon.

12. The composite of claim 10 wherein the ceramic particles are silicon carbide.

13. The composite of claim 10 wherein the matrix is substantially completely dense.

14. The composite of claim 13 wherein the fiber comprises silicon carbide, the fiber has a non-oxide coating thereon, and the ceramic particles are silicon carbide.

15. The composite of claim 14 wherein the matrix is substantially completely dense and consists essentially of infiltrated silicon carbide particulate and silicon.

16. The composite of claim 13 wherein the non-oxide ceramic coating comprises boron nitride.

17. The composite of claim 14 wherein the boron nitride has a thickness of 0.5 to 2 um.

18. The composite of claim 13 wherein the fiber comprises silicon carbide and has thermal stability at a temperature of at least 1420° C.

19. The composite of claim 13 wherein the infiltrated ceramic particulate phase comprises a silicon carbide particulate phase.

20. The composite of claim 13 having no silicon veins.

21. A composite comprising:
   a) ceramic fiber comprising silicon carbide having a coating thereon, the coating comprising boron nitride having a thickness of between 0.5 and 2 um, and
   b) a matrix surrounding the fiber having a coating thereon, the matrix consisting essentially of a continuous phase and an infiltrated ceramic particulate phase.

22. The composite of claim 21 wherein the matrix is substantially completely dense.

23. A composite comprising:
   a) fiber comprising silicon carbide, the fiber having thermal stability at a temperature of at least 1420° C., and
   b) a matrix surrounding the fiber, the matrix consisting essentially of a continuous phase and an infiltrated ceramic particulate phase.

24. The composite of claim 23 wherein the matrix is substantially completely dense and the continuous phase is silicon.

* * * * *